United States Patent
Dubhashi

(10) Patent No.: US 6,969,971 B2
(45) Date of Patent: Nov. 29, 2005

(54) REVERSE BATTERY PROTECTION CIRCUIT

(75) Inventor: Ajit Dubhashi, Redondo Beach, CA (US)

(73) Assignee: International Rectifier Corporation, El Segundo, CA (US)

(*) Notice: Subject to any disclaimer, the term of this patent is extended or adjusted under 35 U.S.C. 154(b) by 82 days.

(21) Appl. No.: 10/726,894

(22) Filed: Dec. 2, 2003

(65) Prior Publication Data

US 2004/0145353 A1 Jul. 29, 2004

Related U.S. Application Data

(60) Provisional application No. 60/431,155, filed on Dec. 5, 2002.

(51) Int. Cl.⁷ ................................................. H02J 7/00
(52) U.S. Cl. ................................................. 320/107
(58) Field of Search ............................ 320/107, 101, 320/136; 307/138, 134; 361/84, 90, 18; 327/309

(56) References Cited

U.S. PATENT DOCUMENTS

| | | | |
|---|---|---|---|
| 5,012,381 A | * | 4/1991 | Elliott et al. ................... 361/84 |
| 5,477,124 A | | 12/1995 | Tamai |
| 5,767,657 A | * | 6/1998 | Oglesbee .................... 320/101 |
| 5,886,503 A | * | 3/1999 | McAndrews et al. ........ 320/121 |
| 6,118,253 A | * | 9/2000 | Mukainakano et al. ..... 320/134 |
| 6,154,081 A | * | 11/2000 | Pakkala et al. .............. 327/309 |
| 6,288,881 B1 | * | 9/2001 | Melvin et al. ................. 361/18 |
| 6,519,126 B2 | * | 2/2003 | Tamura ......................... 361/84 |
| 6,577,482 B1 | * | 6/2003 | Eisenhardt et al. ........... 361/84 |
| 6,608,470 B1 | * | 8/2003 | Oglesbee et al. ............ 320/136 |
| 6,608,482 B2 | * | 8/2003 | Sakai et al. .................. 324/426 |
| 6,791,809 B2 | * | 9/2004 | Pannwitz ...................... 361/90 |

FOREIGN PATENT DOCUMENTS

| | | |
|---|---|---|
| EP | 1 206 025 A2 | 5/2002 |
| JP | 2001069674 | 3/2001 |
| WO | 02/091542 A1 | 11/2002 |

\* cited by examiner

*Primary Examiner*—Pia Tibbits
(74) *Attorney, Agent, or Firm*—Ostrolenk, Farb, Gerb & Soffen, LLP

(57) ABSTRACT

A reverse battery protection circuit comprising a first controlled semiconductor switch for providing current to a load and coupled in series with load terminals across which load terminals the load is adapted to be connected and a second controlled semiconductor switch disposed in a series circuit with a free wheeling diode, the series circuit being coupled across the load terminals.

6 Claims, 2 Drawing Sheets

REVERSE BATTERY PROTECTION CIRCUIT

CROSS REFERENCE TO RELATED APPLICATION

This application is based on and claims priority of U.S. provisional patent application Ser. No. 60/431,155, filed Dec. 5, 2002, entitled LOW COST REVERSE BATTERY PROTECTION, the entire disclosure of which is incorporated herein by reference.

BACKGROUND OF THE INVENTION

Most battery powered applications require reverse battery protection which protects equipment from damage due to a misconnected battery and the consequent polarity inversion. In many cases a simple diode in the +ve or −ve bus can offer adequate protection. In cases of large current systems, a FET may be used to reduce the voltage drop and thus reduce the power losses and consequently reduce the size of the heatsink.

Figure 1:
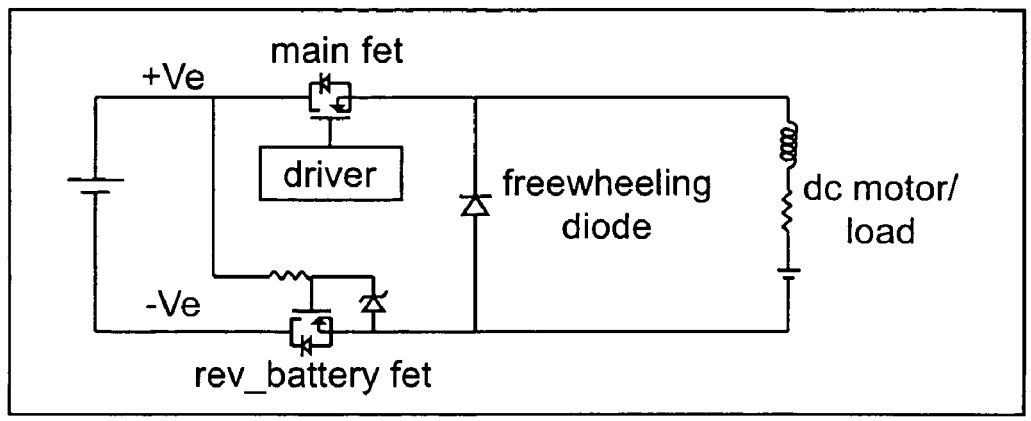

FIG. 1 shows a typical configuration where such a such a scheme is used where the FET is in the −ve DC path which reduces the complexity of the drive circuit for the reverse battery FET.

Placing the reverse battery FET in the position of FIG. 1 (i.e. in the −ve rail) causes equal current in the reverse battery FET as in the main FET. This implies that a large amount of silicon needs to be used in conjunction with a larger heatsink.

In many systems the duration of the current flow through the freewheeling diode is of a low duty cycle (such as simple low frequency PWM fan controls, solid state relays (SSRs), engine start systems and load disconnect devices). In these application it is advantageous to use an alternate scheme.

SUMMARY OF THE INVENTION

The invention provides an alternative solution to the reverse battery protection problem that is simple and low cost.

According to the invention, a reverse battery protection circuit is provided comprising a first controlled semiconductor switch for providing current to a load and coupled in series with load terminals across which load terminals the load is adapted to be connected, and a second controlled semiconductor switch disposed in a series circuit with a free wheeling diode, the series circuit being coupled across the load terminals.

Other features and advantages of the present invention will become apparent from the following description of the invention which refers to the accompanying drawings.

BRIEF DESCRIPTION OF THE DRAWING(S)

Figure 2:
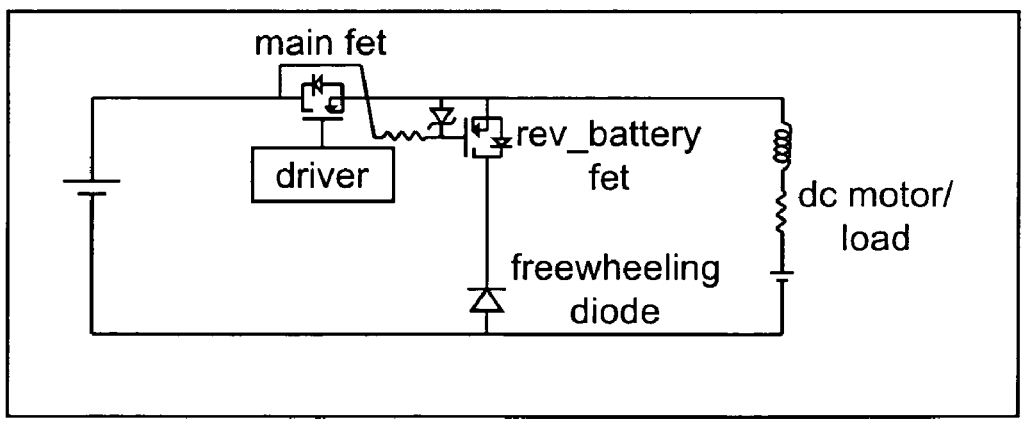
Figure 3:
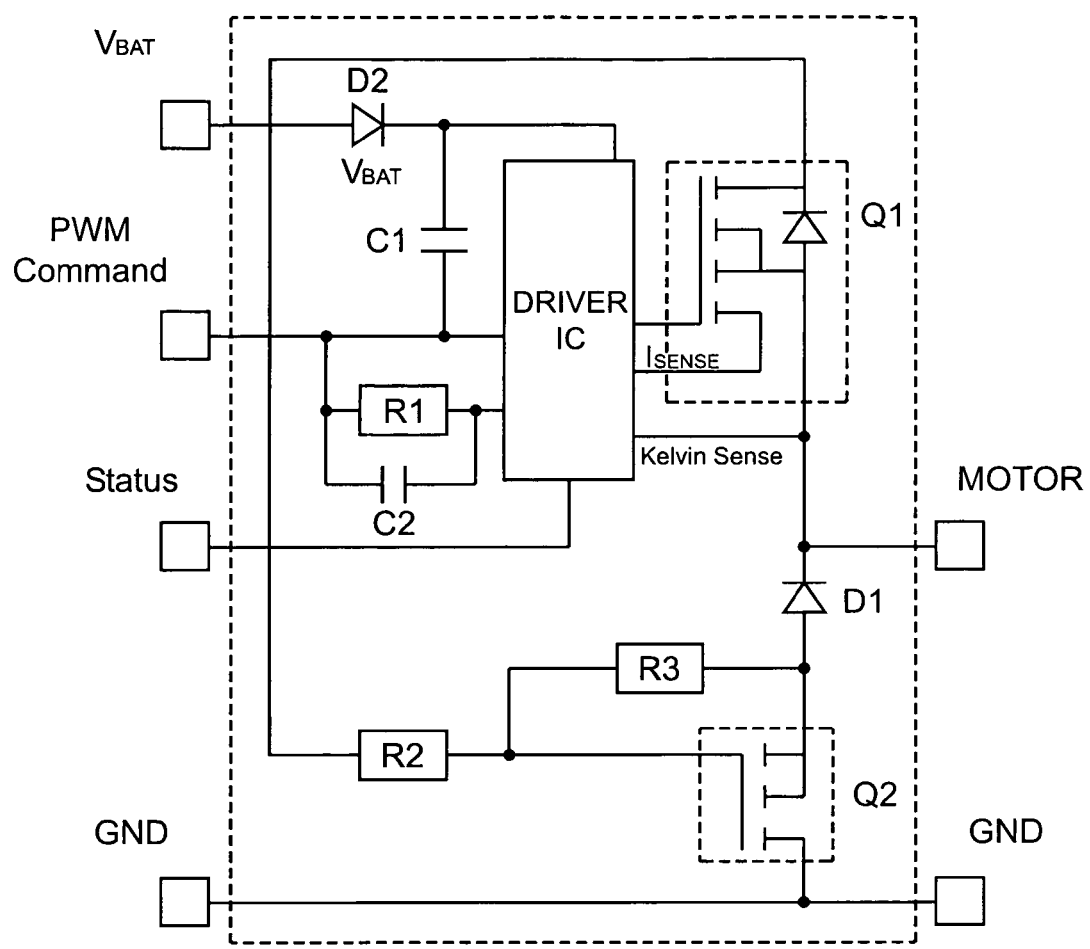

FIG. 1 shows a prior art reverse battery protection circuit;
FIG. 2 shows the circuit according to the invention; and
FIG. 3 shows an alternative embodiment of the invention.

DETAILED DESCRIPTION OF PREFERRED EMBODIMENTS

With reference now to FIG. 2, the alternate approach places the reverse battery FET in the 'freewheeling diode' path and polarized such that the intrinsic diode of the FET will oppose any applied reverse voltage. In this case it is important to note that the reverse battery FET protects the module itself from short circuiting the applied −ve voltage but does not protect the load from the negative voltage. This may be permissible in many application such as motors where the motor will simply rotate in the reverse direction for the time the reverse battery connection is made.

The method of operation of the circuit is that whenever the main FET turns on, it causes the Vgs of the reverse battery FET to go to a low value that turns it off. When the main FET turns off, the voltage from its drain to source goes high and thus this voltage is applied to the Vgs of the reverse battery FET which turns on and allows the current to freewheel. A zener diode may be necessary for protecting the gate from voltages over its rating.

As the application has the freewheeling current occurring for a short duration, the average current that needs to be carried by the reverse battery FET is low and hence a smaller FET as well as a smaller heatsink can be used.

Utilizing the Vds voltage of the main FET to turn on the reverse battery FET allows the user to avoid the requirement of using a special driver for this second FET and helps reduce costs even more.

When the circuit of FIG. 2 has the battery connections reversed, the reverse battery FET is turned off, thereby preventing short circuiting of the Ve bus if the main FET is on. The intrinsic diode of the reverse battery FET is reversed biased during reverse battery connection. As described above, during reverse battery connection, the load is not protected from the negative voltage, but this is acceptable in many applications, such as motors, where the motor will simply rotate in reverse during reverse battery connection.

FIG. 3 shows an alternative embodiment. In FIG. 3, Q1 is the main FET and Q2 is the reverse battery FET connected in series with the free wheeling diode D1. The driver IC drives Q1 and receives battery power on VBAT via diode D2 and ground. The driver IC is controlled from input PWM Command and provides a status output on line Status. Transistor Q2 is turned on via resistor R2 when proper battery connections are made, allowing diode D1 to free wheel. When the battery connections are reversed, Q2 is turned off and its intrinsic diode (not shown) is back biased.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:
1. A reverse battery protection circuit comprising:
   a first controlled semiconductor switch for providing current to a load and coupled in series with load terminals across which load terminals the load is adapted to be connected; and
   a second controlled semiconductor switch disposed in a series circuit with a free wheeling diode, the series circuit being coupled across the load terminals; and
   wherein the load terminals comprise a first load terminal switched to the battery positive terminal through the first controlled semiconductor switch and the second load terminal is coupled to the battery negative terminal.

2. The circuit of claim 1, wherein the second controlled semiconductor switch has a control electrode coupled to a main current carrying electrode of the main switch.

3. The circuit of claim 1, wherein the semiconductor switches comprise FETs.

4. The circuit of claim 3, wherein the control electrode of the second controlled semiconductor switch is coupled to the drain of the first controlled semiconductor switch.

5. The circuit of claim 4, further comprising a zener diode coupled between gate and source of the second controlled semiconductor switch.

6. The circuit of claim 1, further comprising a driver circuit for the first controlled semiconductor switch.

* * * * *